W. JEAVONS.
SIGNALING SET.
APPLICATION FILED NOV. 18, 1915.
1,200,730.
Patented Oct. 10, 1916.
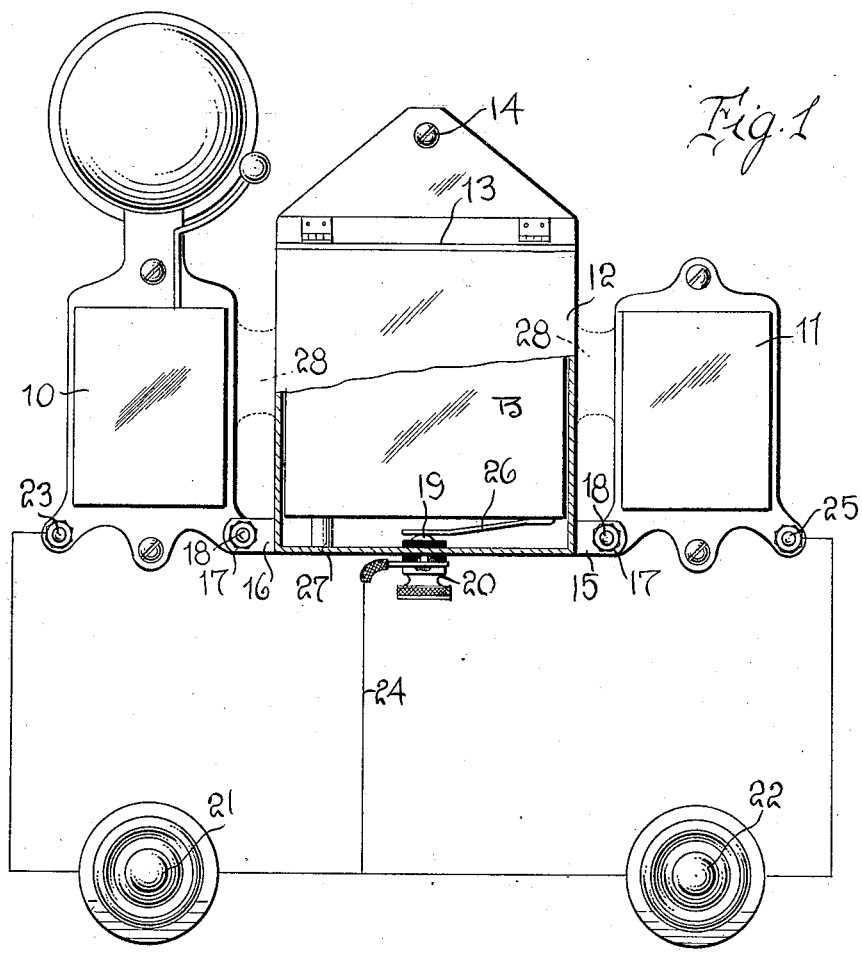
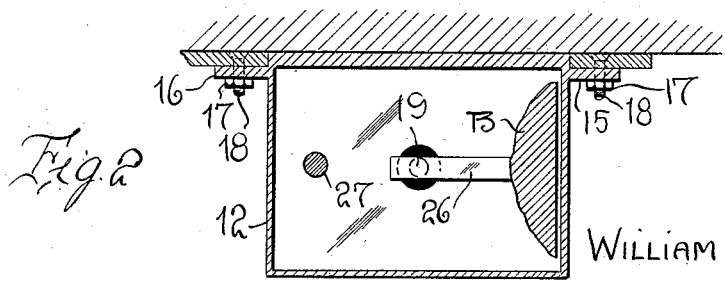
Inventor
WILLIAM JEAVONS
By Watson E. Coleman
Attorney

UNITED STATES PATENT OFFICE.

WILLIAM JEAVONS, OF CLEVELAND, OHIO.

SIGNALING SET.

1,200,730. Specification of Letters Patent. Patented Oct. 10, 1916.

Application filed November 18, 1915. Serial No. 62,190.

*To all whom it may concern:*

Be it known that I, WILLIAM JEAVONS, a citizen of the United States, residing at Cleveland, in the county of Cuyahoga and State of Ohio, have invented certain new and useful Improvements in Signaling Sets, of which the following is a specification, reference being had to the accompanying drawings.

My invention relates to electrical appliances and particularly to a battery box or container.

The primary object of my invention is the provision of a battery box or container, so constructed that it may be attached directly to one or more bells or other electrically actuated signals without the use of wiring, and a further object in this connection is to provide a battery box or container so constructed that the battery may be inserted into the box in a number of positions and yet be connected with the bells or signals without the aid of wiring.

A further object of the invention is to so construct the battery box that it will itself form one of the conductors leading from the battery to the bells, thus doing away with a considerable amount of wiring.

Still another object is to provide a battery box or container so constructed that the battery may be inserted therein and when inserted will automatically be placed in circuit with the bells or other electrically actuated signals.

Still another object of the invention is to provide a battery box and attached signals whereby the battery box and signals will form a unitary attachment adapted to be mounted in any suitable manner in conjunction with each other and connected by suitable wiring to actuating buttons or circuit closures.

Other objects will appear in the course of the following description.

My invention is illustrated in the accompanying drawings, wherein:

Figure 1 is a front elevation of a signaling set constructed in accordance with my invention, the front wall of the battery box being broken away and the side walls shown in section; Fig. 2 is a transverse sectional view of the battery box or container.

In the drawings, 10 designates an ordinary electrically actuated bell signal of the kind commonly found on the market.

11 designates an electrically actuated buzzer signal of the kind commonly used.

Inasmuch as the construction of these electrically actuated signals 10 and 11 is well understood by those skilled in the art, no further description of these signals is deemed to be necessary.

Disposed in conjunction with the signals 10 and 11 and located between these signals is a battery casing or box, designated 12. As illustrated, the bottom of the box is made of metal, and at its upper end the box is closed by a cover 13 which may be raised to insert or remove the battery B. The battery box is adapted to be fastened to a wall in any suitable manner, as by means of a screw 14, or to be disposed upon a shelf or bracket. The battery box at its lower end is provided with two laterally projecting ears 15 and 16 which are operatively connected by means of nuts 17 to one of the binding posts 18 of the electrically actuated signals 10 and 11 respectively. These ears 15 are of metal and are made as part of the box itself and integral with the bottom of the box. Disposed at the middle of the bottom of the box is a contact stud 19 which extends through the box but is entirely insulated therefrom and has engagement with a binding nut 20. I have illustrated two circuit closing push buttons 21 and 22 of any ordinary or suitable construction, the push button 21 being connected in circuit with the binding post 23 of the signal 10 and also with a common return wire 24 extending to the binding post 19. The push button 22 is connected in circuit with the binding post 25 of the signaling device 11 and with the return wire 24.

The battery B is of that type of battery having a spring contact member 26 extending over or across the center of the battery and at one side with the pole piece or contact 27. When the battery is inserted within the battery box, the spring member 26 will engage with the binding post 19 while the member 27 will engage with the wall of the battery box. Under these circumstances when the button 21 is closed the signal 10 will be in circuit with the battery and will be sounded. When the button 22 is closed the signal 11 will be connected with the battery and the buzzer sounded.

I have shown in Fig. 1 the bases of the signals 10 and 11 as being connected by integral webs 28 to the back of the battery box, and it will be obvious that I can make this signaling set as one integral attachment or that these webs may be omitted so that the battery box may be disposed between the signals 10 and 11 and simply connected thereto by the lugs 15 and 16. The particular advantages of my invention are that by mounting the buzzer and the signal bell adjacent to the battery box and using the battery box as a portion of the circuit I do away with the wiring which is ordinarily necessary from the battery in the box to the signal, so that it is a very simple matter to put up a signal set in any desired location. Furthermore, no disconnection of wires is necessary in order to remove the battery or replace it with a fresh battery. It is only necessary to withdraw the battery B from the battery box and then replace it, and my device is further advantageous in that there is no difficulty in placing the battery in the box in proper position. It does not matter whether the battery is inserted so that the pole 27 will be on the right or left hand of the box or at the back or front of the box inasmuch as in any of these positions it will engage with the metallic wall of the battery box and the spring contact 26 which is connected to the other pole of the battery will at all times be in engagement with the binding post 19. It will be seen that the bottom of the battery box constitutes a metallic conducting member having the ears 15 and 16 formed therewith. It will be seen that my device will save a large amount of trouble in wiring a house.

Having described my invention, what I claim is:

The combination with a dry cell having a centrally disposed electrode and a marginally disposed electrode, and an outer casing through which said electrodes project, of a container or box therefor having a size equal to that of the cell whereby the cell will be centered in the box, one wall of the box including a metallic member extending across the box and projecting exteriorly thereto and adapted for electrical engagement with signaling devices, the said wall at its center being formed with a binding post insulated from said metallic member, the binding post being adapted to engage with the centrally disposed electrode of the battery, the other electrode of the battery engaging with said metallic member.

In testimony whereof I hereunto affix my signature in the presence of two witnesses.

WILLIAM JEAVONS.

Witnesses:
C. F. GOTTSCHALK,
WILLIAM MAY.

Copies of this patent may be obtained for five cents each, by addressing the "Commissioner of Patents, Washington, D. C."